US012753025B2

(12) United States Patent
Dye et al.

(10) Patent No.: US 12,753,025 B2
(45) Date of Patent: Oct. 6, 2026

(54) PRODUCT ENGAGEMENT ASSEMBLY, RELATED SYSTEMS AND METHODS

(71) Applicant: Graphic Packaging International, LLC, Atlanta, GA (US)

(72) Inventors: Ryan Dye, Marietta, GA (US); Robert H. Irvine, Nisswa, MN (US); Eric Fenzl, Loganville, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 147 days.

(21) Appl. No.: 18/777,788

(22) Filed: Jul. 19, 2024

(65) Prior Publication Data

US 2025/0026587 A1 Jan. 23, 2025

Related U.S. Application Data

(60) Provisional application No. 63/527,974, filed on Jul. 20, 2023.

(51) Int. Cl.
*B65G 47/90* (2006.01)
*B65G 47/244* (2006.01)

(52) U.S. Cl.
CPC ......... *B65G 47/901* (2013.01); *B65G 47/244* (2013.01); *B65G 2201/0235* (2013.01)

(58) Field of Classification Search
None
See application file for complete search history.

(56) References Cited

U.S. PATENT DOCUMENTS 4,732,259 A * 3/1988 Yu ........................ B65G 47/844 198/370.02
5,275,273 A * 1/1994 Veit ........................ E01B 25/12 198/370.02
5,613,591 A * 3/1997 Heit ..................... B65G 47/844 198/370.02
6,478,144 B1 * 11/2002 Sweazy .................. B07C 3/065 198/370.02

(Continued)

FOREIGN PATENT DOCUMENTS

EP 1020359 7/2000
EP 1192863 A2 4/2002
JP 2017-013911 A 1/2017

OTHER PUBLICATIONS

International Search Report and Written Opinion for PCT/US2024/038660 dated Oct. 29, 2024.

*Primary Examiner* — Kavel Singh
(74) *Attorney, Agent, or Firm* — Andrew N. Claerbout; FisherBroyles, LLP

(57) ABSTRACT

A method of engaging a plurality of products, the method includes positioning the plurality of products on a conveyor assembly, driving the conveyor assembly to move the plurality of products in a machine direction, driving a plurality of flight assemblies in a closed path about a product engaging assembly positioned above the conveyor assembly, engaging a respective product with a respective flight assembly, and engaging the respective flight assembly with a respective cam track of a plurality of cam tracks along a cam plate of the product engaging assembly to one of maintain a rotational arrangement of a portion of the respective flight assembly or cause the portion of the respective flight assembly to rotate.

31 Claims, 12 Drawing Sheets

(56) References Cited

U.S. PATENT DOCUMENTS

| | | | | |
|---|---|---|---|---|
| 9,038,809 | B2 * | 5/2015 | Wilkins | B65G 47/844<br>198/370.02 |
| 2012/0085623 | A1 | 4/2012 | Wipf | |
| 2016/0251168 | A1 | 9/2016 | Barber et al. | |

* cited by examiner

141

PRODUCT ENGAGEMENT ASSEMBLY, RELATED SYSTEMS AND METHODS

CROSS-REFERENCE TO RELATED APPLICATION

The present application claims the benefit of and priority to U.S. Provisional Patent Application No. 63/527,974, filed on Jul. 20, 2023.

INCORPORATION BY REFERENCE

The disclosure of U.S. Provisional Patent Application No. 63/527,974, filed on Jul. 20, 2023, is hereby incorporated by reference for all purposes as if set forth in its entirety.

BACKGROUND OF THE DISCLOSURE

The present disclosure generally relates to product engagement assemblies, and methods and systems related thereto, for at least partially moving and/or diverting products along a machine path.

SUMMARY OF THE DISCLOSURE

According to one aspect, the disclosure is generally directed to a method of engaging a plurality of products, the method comprising positioning the plurality of products on a conveyor assembly, driving the conveyor assembly to move the plurality of products in a machine direction, driving a plurality of flight assemblies in a closed path about a product engaging assembly positioned above the conveyor assembly, engaging a respective product with a respective flight assembly, and engaging the respective flight assembly with a respective cam track of a plurality of cam tracks along a cam plate of the product engaging assembly to one of maintain a rotational arrangement of a portion of the respective flight assembly or cause the portion of the respective flight assembly to rotate.

According to another aspect, the disclosure is generally directed to a system for engaging a plurality of products, the system comprising a conveyor assembly configured to move the plurality of products in a machine direction, a product engaging assembly positioned above the conveyor assembly, the product engaging assembly comprising a plurality of flight assemblies for engaging a respective product of the plurality of products, the product engaging assembly comprising a cam plate and a plurality of cam tracks extending at least partially therealong, the plurality of flight assemblies movably supported along a closed path for engaging a respective cam track of a plurality of cam tracks for one of maintaining a rotational arrangement of a portion of the respective flight assembly or causing the portion of the respective flight assembly to rotate.

According to another aspect, the disclosure is generally directed to a product engagement assembly for engaging a plurality of products, the product engagement assembly comprising a plurality of flight assemblies for engaging a respective product of the plurality of products, a cam plate, and a plurality of cam tracks extending at least partially along the cam plate, the plurality of flight assemblies movably supported along a closed path for engaging a respective cam track of a plurality of cam tracks for one of maintaining a rotational arrangement of a portion of the respective flight assembly or causing the portion of the respective flight assembly to rotate.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to product engagement assemblies, and related systems and methods, for moving one or more products through a system. Products described herein can include packages including one or more articles such as food and/or beverage products. In this regard, products described herein can relate to cartons, carriers, trays, etc. containing one or more articles, for example containers such as beverage cans or bottles. Such containers can be made from materials suitable in composition for packaging the particular food or beverage item, and the materials include, but are not limited to, glass; plastics such as PET, LDPE, LLDPE, HDPE, PP, PS, PVC, EVOH, and Nylon; and the like; aluminum and/or other metals; or any combination thereof.

Products according to the present disclosure can include containers of numerous different shapes. In this specification, the terms "lower," "bottom," "upper" and "top" indicate orientations determined in relation to fully erected products holding containers.

Figure 1:
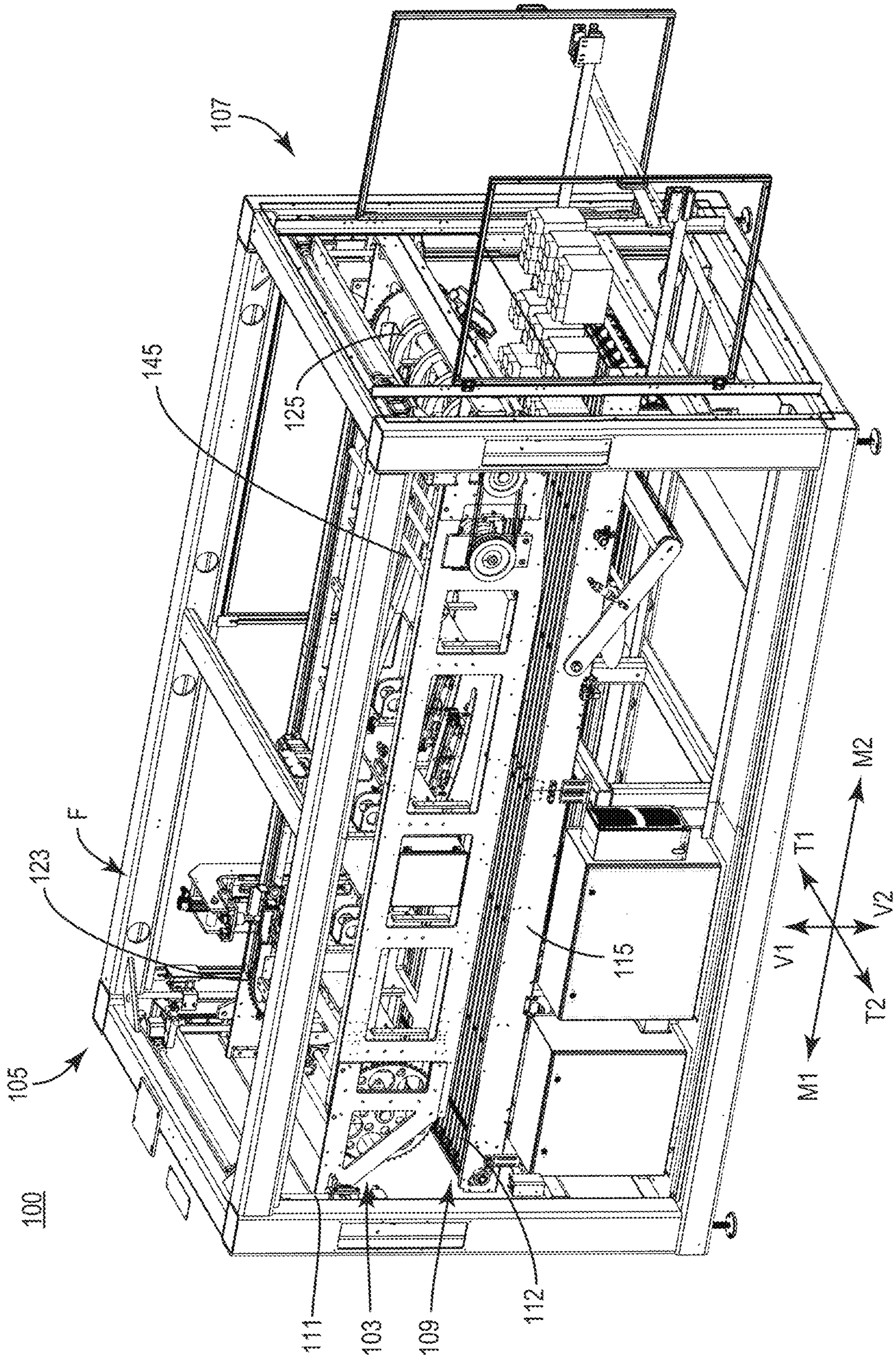
FIG. 1 is a perspective view of a system and method for engaging products according to an exemplary embodiment of the disclosure.

FIG. 1 is a perspective view of a portion of a system 100 that includes as least one product engagement assembly 103 for engaging and/or moving one or more products P therealong. As described herein, the at least one product engagement assembly 103 can be a portion of the system 100 for moving one or more products in a downstream or machine direction M1 that at least partially extends away from an upstream portion or upstream end 105 of the system 100 toward a downstream portion or downstream end 107 of the system 100. An upstream direction M2 can be defined opposite the machine direction M1. Furthermore, first and second transverse directions T1, T2 can be defined extending perpendicularly away from the machine directions M1, M2.

In this regard, the product engagement assembly 103 can be configured to move one or more products in the machine direction M1, for example, from an upstream station or component of the system 100. In some embodiments, such stations or systems can include one or more of blank feeder assemblies, blank processing assemblies (such as folding assemblies, gluing assemblies), product loading assemblies, product grouping assemblies, product metering assemblies, turner and/or divider stations, etc. In some embodiments, an upstream end of the system 100 can be at least partially defined by the product engagement assembly 103.

Furthermore, the product engagement assembly 103 can be configured to move the one or more blanks/constructs in the machine direction M1 toward a downstream station or component of the system 100, for example, one or more of blank processing assemblies (such as folding assemblies, gluing assemblies), product loading assemblies, product grouping assemblies, product metering assemblies, construct and/or product wrapping stations, turner and/or divider stations, etc. In some embodiments, a downstream end of the system 100 can be at least partially defined by the product engagement assembly 103.

As shown, the system 100 can also include a conveyor assembly 109 positioned below the product engagement assembly 103, with the directions M1, M2, T1, T2 generally lying along a plane corresponding to an upper surface of the conveyor assembly 109.

The system 100 can include a machine frame F supporting at least the product engagement assembly 103 and the conveyor assembly 109, as well as various components thereof described herein. The frame F can include one or more of bases, legs, struts, tie bars, platforms, etc., in various arrangements, to provide a supporting structure for the assemblies and components described herein. For example, the machine frame F can support such components above a base surface such as a ground or floor, and can provide access at one or more locations for human operators, e.g., to inspect, maintain, and/or otherwise operate the system 100. In one embodiment, the system 100 can be provided without an external frame.

Figure 2:
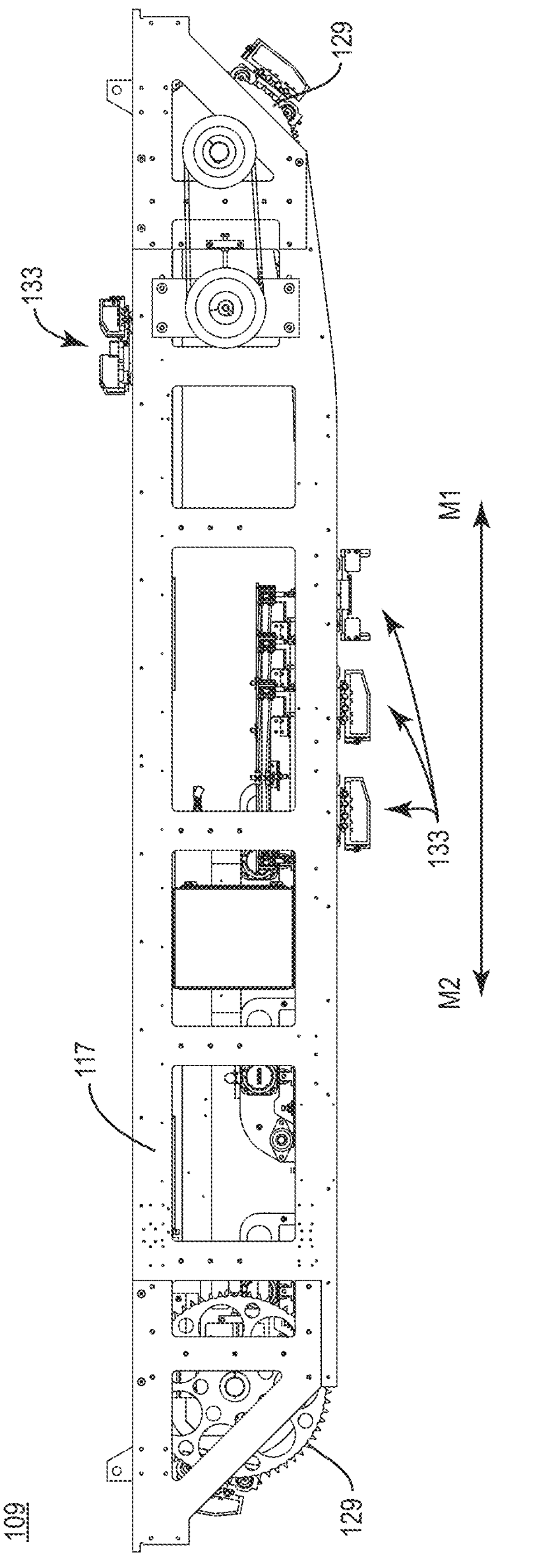
FIG. 2 is a side elevation view of a product engagement assembly of the system and method of FIG. 1 according to an exemplary embodiment of the disclosure.

As shown in FIG. 2, one or more actuators 111 can be coupled to the frame F, and can be provided in mechanical communication with the product engagement assembly 103. The actuators 111 can be configured to move the product engagement assembly 103 vertically relative to the conveyor assembly 109 in a first vertical direction V1 away from the conveyor assembly 109 or in an opposite second vertical direction V2 toward the conveyor assembly 109. The directions V1, V2 can be generally perpendicular to each of the directions M1, M2, T1, T2. In some embodiments, the actuators 111 can be screw jacks, though it will be understood that one or more of the actuators 111 can be of a different configuration, e.g., pneumatic or hydraulic actuators, etc., without departing from the disclosure.

With reference to FIG. 1, the conveyor assembly 109 can include a conveyor belt 112 extending in an at least partially closed path. In some embodiments, the conveyor belt 112 can be arranged in a generally elliptical path, though it will be understood that one or more portions of the closed path include one or more of generally oblique, straight, and curved portions extending away from a generally elliptical path.

In this regard, one or more portions of the conveyor belt 112 can be arranged extending around or otherwise in mechanical communication with one or more respective driving mechanisms, e.g., rotational components such as rollers, pulleys, gears, belts, etc. of the system 100. In one embodiment, such rotational components can be directly rotated by a driving member/rotational actuator, e.g., one or more motors, or one or more intermediate mechanical transmissions can be provided between such motor(s) and the rotational actuator(s).

As shown, the conveyor assembly 109 can include one or more supports 115, e.g., guides, rails, plates, rods, etc., for at least partially maintaining movement of one or more items supported on the conveyor assembly 109 along the machine direction M1.

Figure 3:
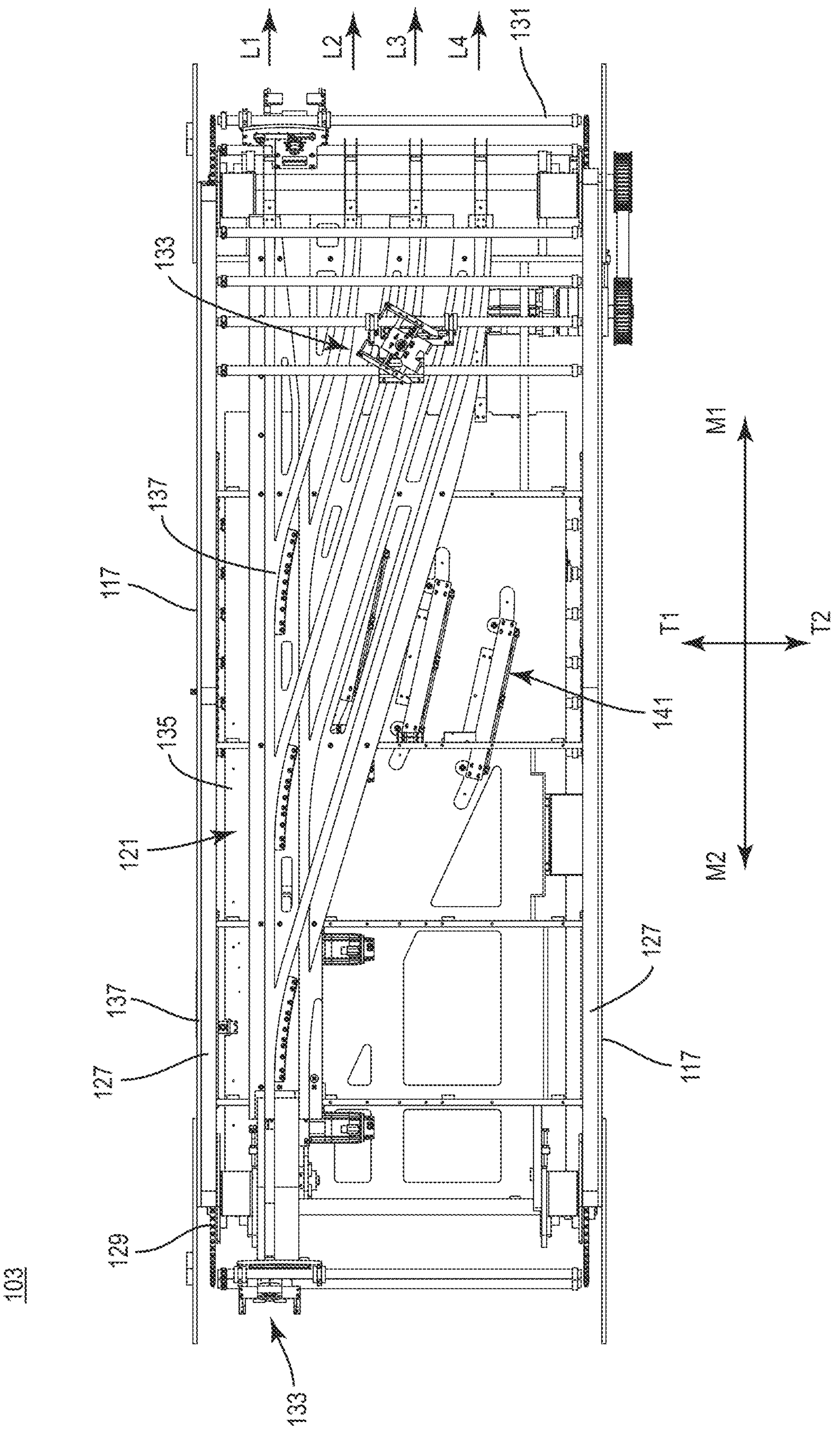
FIG. 3 is a bottom plan view of the product engagement assembly of the system and method of FIG. 1 according to an exemplary embodiment of the disclosure.

With additional reference to FIGS. 2 and 3, the product engagement assembly 103 can have a generally elongate configuration in the directions M1, M2, and can include a pair of supports 117 spaced apart along the directions T1, T2 which can be coupled directly or indirectly to the machine frame F (e.g., via the actuators 111), and to which various components of the product engagement assembly 103 can be mounted.

An upper cam plate 119 (FIG. 1) and a lower cam plate 121 can be mounted to the supports 117 and spaced apart along the directions V1, V2, with at least one return rail 123 extending from the upper cam plate 119 to the lower cam plate 121 proximate the upstream end 105 of the system 100, and a plurality of return rails 125 can extend from the lower cam plate 121 to the upper cam plate proximate the downstream end 107 of the system 100.

A pair of looped chains 127 or other rotational members can extend in a generally elliptical or otherwise closed path about a plurality of sprockets 129 or other rotationally driven or rotational driving mechanisms that are rotatably mounted to a respective support 117 of the product engagement assembly 103.

A plurality of flight support bars 131 can extend from one chain 127 to the other, above the upper cam plate 119, below the lower cam plate 121, and away from the return rails 123, 125 so as to follow the path formed by the chains 127 in generally elliptical orbit about interiorly-located components of the product engagement assembly 103.

Respective adjacent pairs of flight support bars 131 can support a respective plurality of flight assemblies 133 for engaging respective products in the system 100, as described further herein.

The lower cam plate 121, as shown, can have a body 135 along which a plurality of cam tracks 137 extend that define and/or associated with a plurality of product lanes L1, L2, L3, L4 below which products supported on the conveyor assembly 109 can move, as described further herein.

The cam tracks 137, as shown, can have one or more of straight, curved, and/or angled portions such that at least the product lanes L2, L3, and L4 can extend at least partially in the transverse direction T2 in addition to the machine direction M1. In this regard, the lane L1 can be a generally straight product lane extending in the machine direction L1 and the lanes L2, L3, L4 can be at least partially curved lanes that at least partially diverge from the product lane L1.

The plurality of cam tracks 137 generally converge to a point of intersection with the return rail 123 proximate an upstream end 105 of the system 100, and the plurality of cam tracks 137 can diverge to a point of intersection with the respective return rails 125 proximate a downstream end 107 of the system 100.

In some embodiments, the cam tracks 137 can be at least partially recessed portions of the body 135 of the lower cam plate 121. In other embodiments, the cam tracks 137 can be formed by raised members coupled to the body 135 of the lower cam plate 121.

The body 135 of the lower cam plate 121 can have one or more discontinuities therealong for at least partially receiving other portions of the product engagement assembly 103. In the illustrated embodiment, the body 135 of the lower cam plate 121 can have a plurality of discontinuities for at least partially receiving respective portions of a respective diverter assembly 139 (FIG. 4) of the product engagement assembly 103. Further, at least partial discontinuities in the body 135 of the lower cam plate 121 can at least partially receive respective bypass assemblies 141 (FIG. 5) of the product engagement assembly 103.

The upper cam plate 119, as shown in FIG. 1, can have a body 143 along which a plurality of cam tracks 145 extend that define a plurality of return paths for respective flight assemblies 133 in the machine direction M2. In this regard, the plurality of cam tracks 145 generally converge to a point of intersection with the return rail 123 proximate an upstream end 105 of the system 100, and the plurality of cam tracks 145 can diverge to a point of intersection with the respective return rails 125 proximate a downstream end 107 of the system 100.

Figure 4:
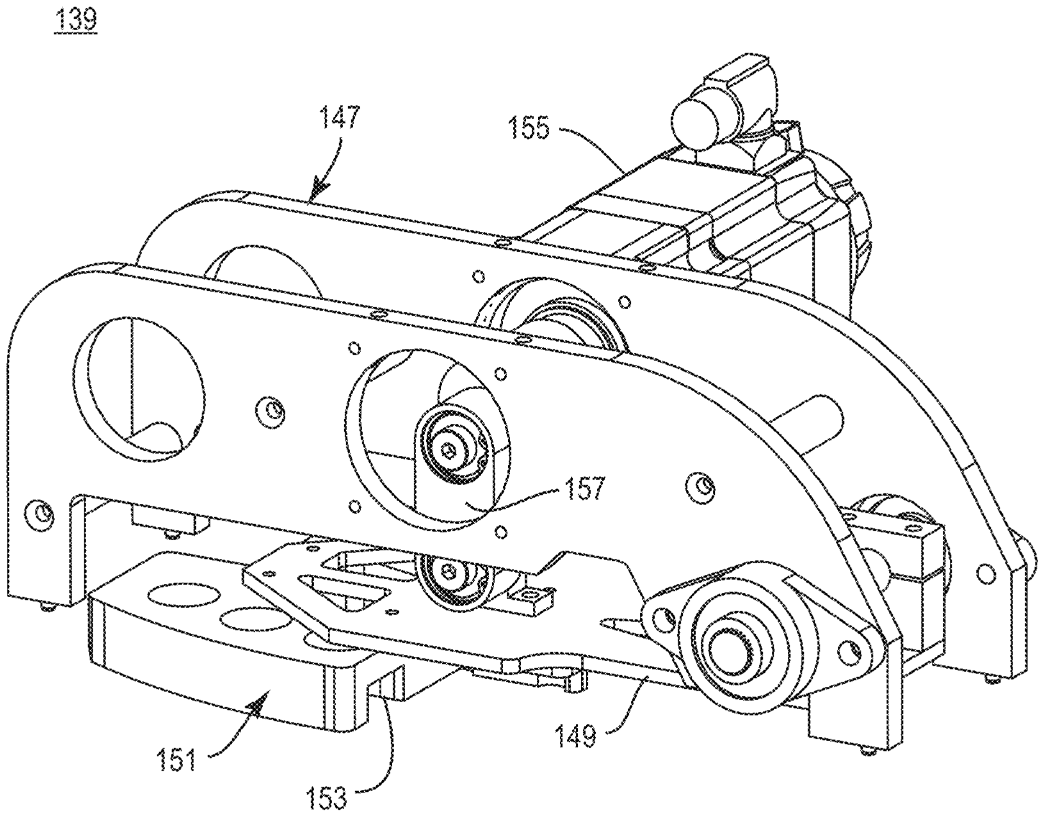
FIG. 4 is a perspective view of a diverter assembly of the product engagement assembly of the system and method of FIG. 1 according to an exemplary embodiment of the disclosure.

With reference to FIG. 4, each diverter assembly 139 of the product engagement assembly 103 can include a mount 147 to which a diverter plate 149 is pivotably mounted. The diverter plate 149, as shown, can carry a diverter body 151 that defines a plurality of diverter track portions 153 for being aligned with respective cam tracks 137 in the lower cam plate 121, as described further herein.

As described herein, the mount 147 of the diverter assembly 139 can be coupled to a surface of the body 135 of the lower cam plate 121 above the cam tracks 137, and an actuator 155, e.g., a motor such as a servo motor, other actuator, etc., can drive the diverter plate 149 to pivot relative to the mount 147 via a linkage 157 coupled between the actuator 155 and the diverter plate 149. In this regard, the actuator 155 can be energized to selectively at least partially pivotably lower the diverter plate 149 and diverter body 151 carried thereon into at least partially coplanar alignment with the body 135 of the lower cam plate 121 such that the diverter track portions 153 can be positioned along respective portions of respective cam tracks 137.

Figure 5:
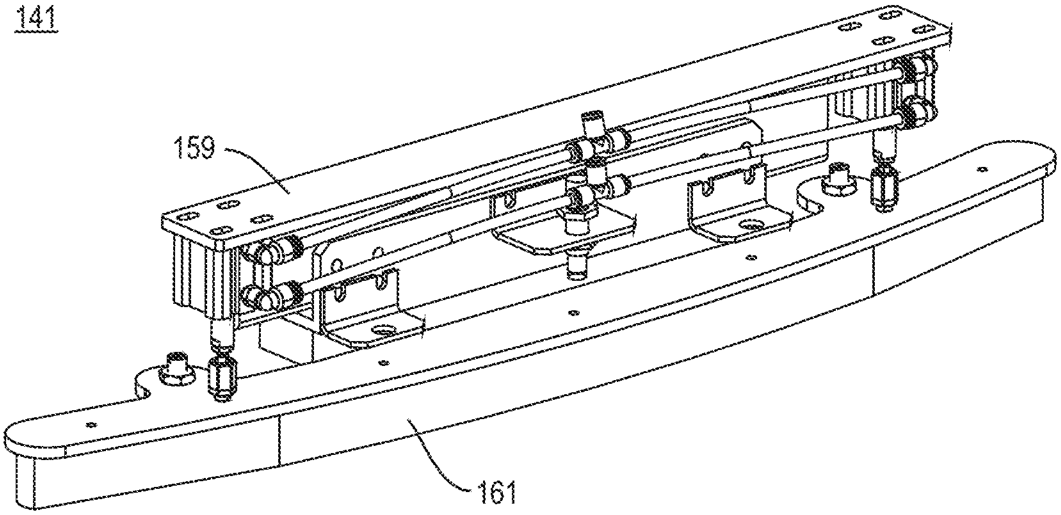
FIG. 5 is a perspective view of a bypass assembly of the product engagement assembly of the system and method of FIG. 1 according to an exemplary embodiment of the disclosure.
Figure 6:
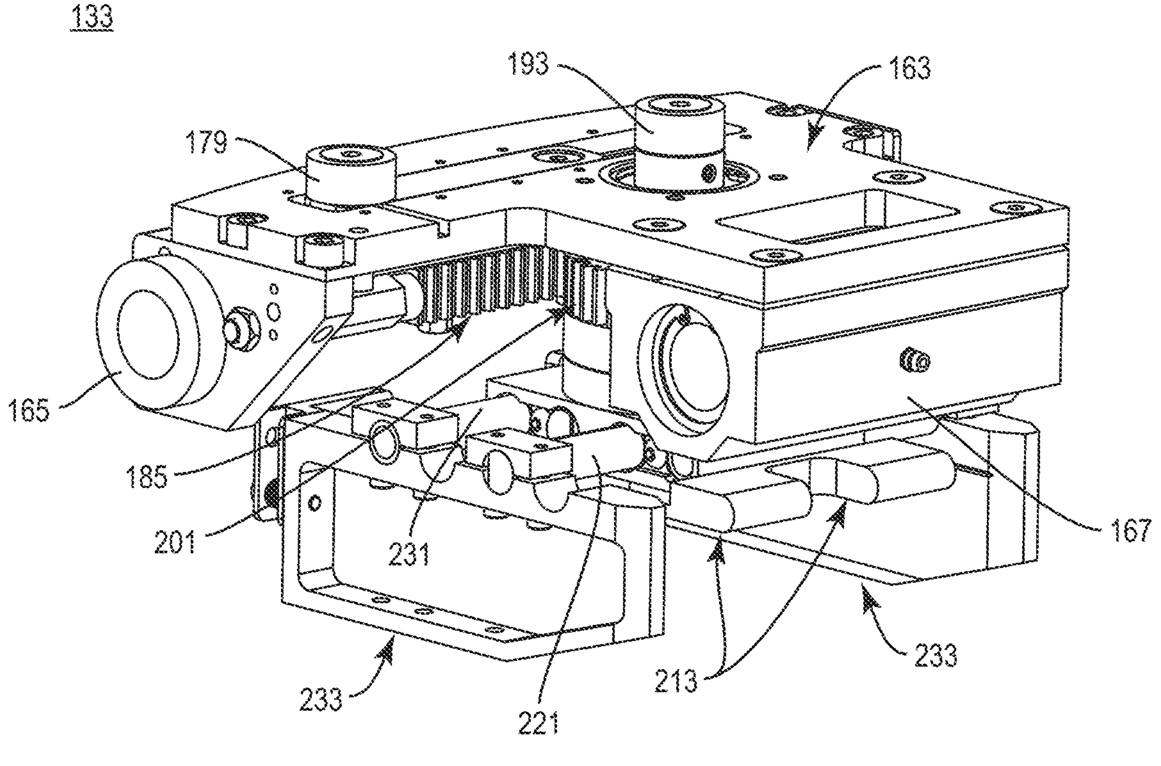
FIG. 6 is a perspective view of a flight assembly of the product engagement assembly of the system and method of FIG. 1 according to an exemplary embodiment of the disclosure.
Figure 7A:
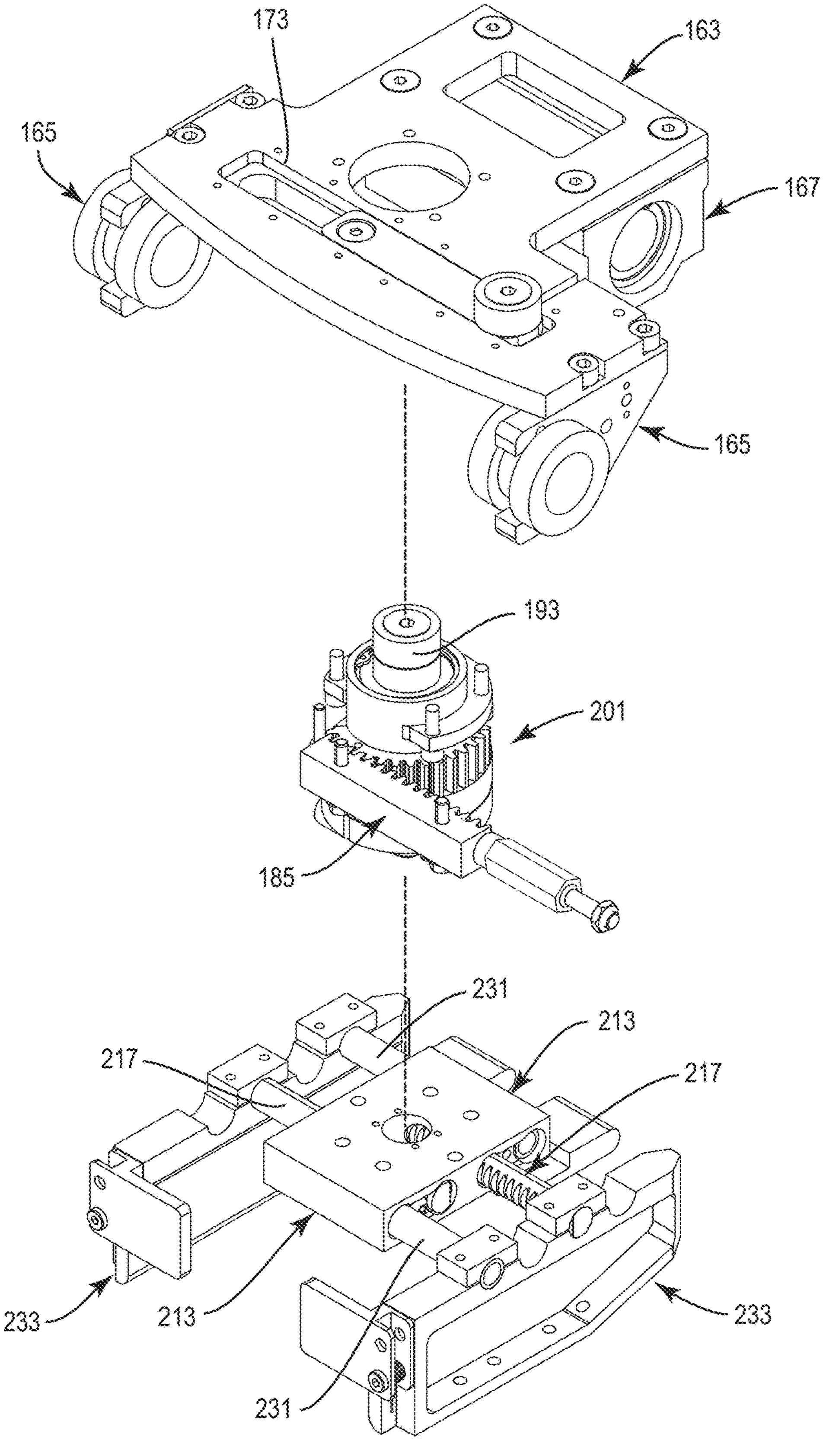
FIG. 7A is a parts-separated view of a flight assembly of the product engagement assembly of the system and method of FIG. 1 according to an exemplary embodiment of the disclosure.
Figure 7B:
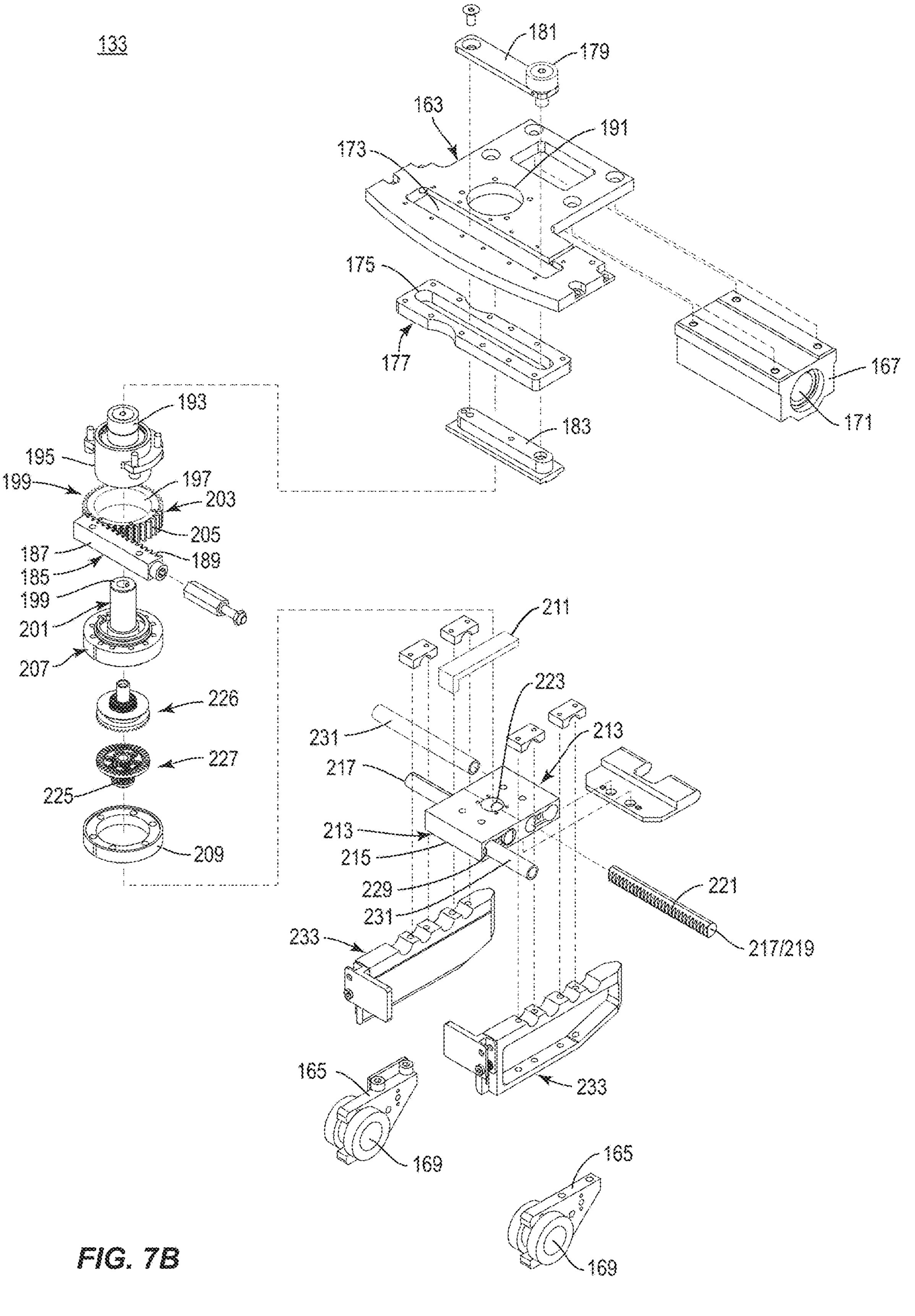
FIG. 7B is another parts-separated view of a flight assembly of the product engagement assembly of the system and method of FIG. 1 according to an exemplary embodiment of the disclosure.
Figure 8A:
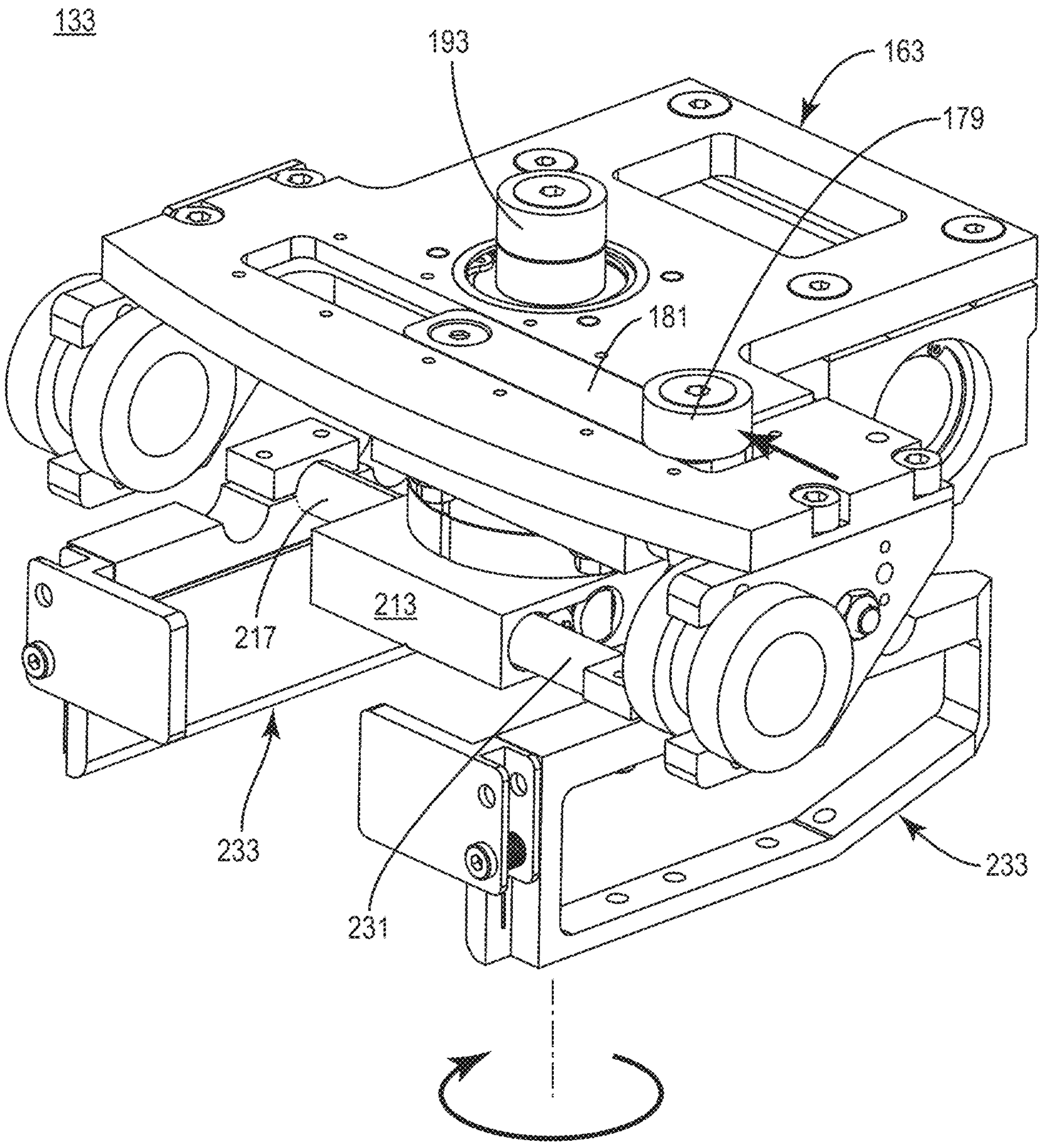
FIG. 8A is a perspective view of a flight assembly of the product engagement assembly of the system and method of FIG. 1 showing directions of relative movement according to an exemplary embodiment of the disclosure.
Figure 8B:
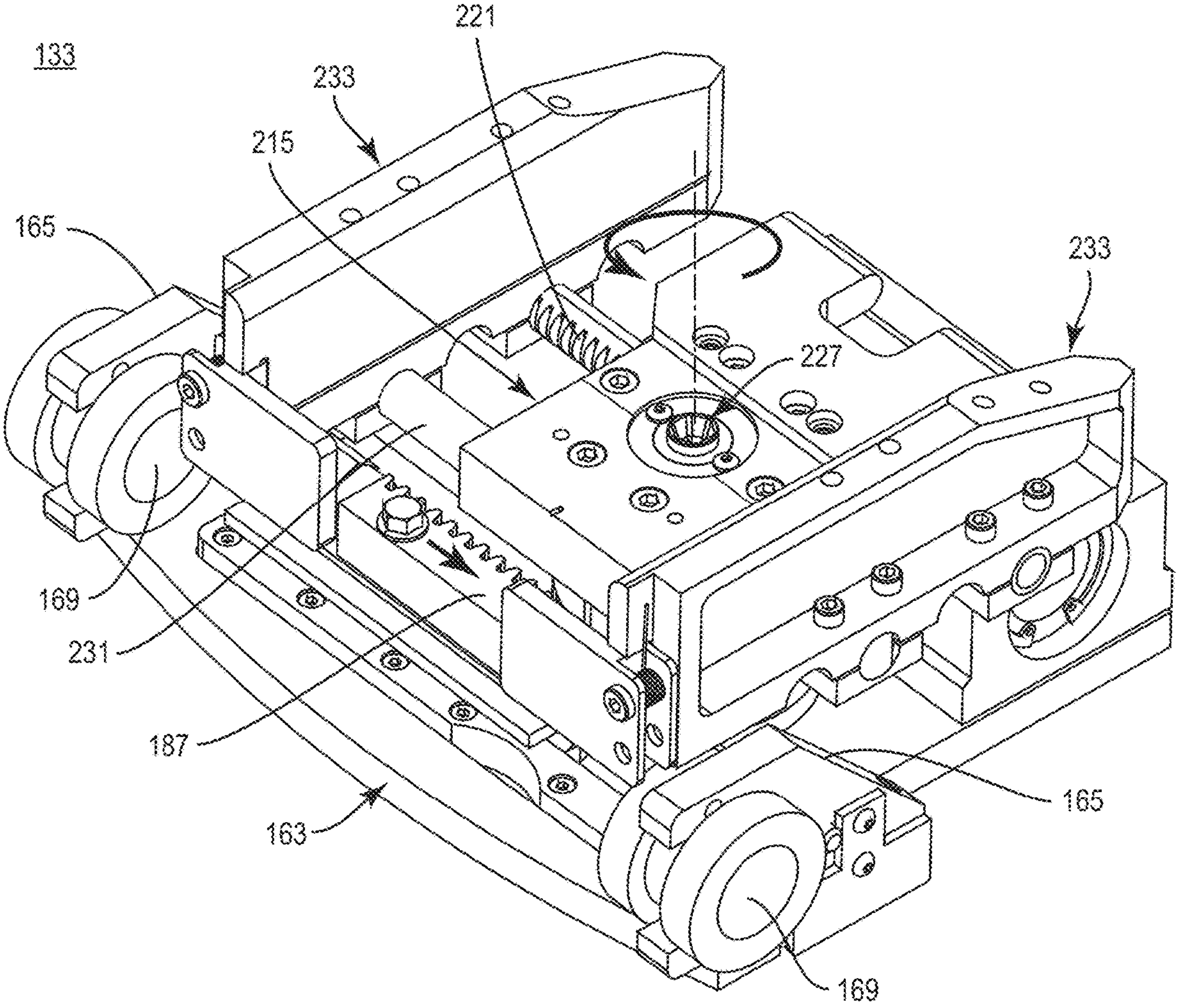
FIG. 8B is another perspective view of a flight assembly of the product engagement assembly of the system and method of FIG. 1 showing directions of relative movement according to an exemplary embodiment of the disclosure.

As shown in FIG. 5, the bypass assemblies 141 can include a mount 159 to which a respective cam track portion 161 is movably coupled, e.g., pivotably coupled and/or linearly moveable in the directions V1, V2. In this regard, an actuator, e.g., a motor such as a servo motor, other actuator such as an air cylinder, etc., can drive the cam track portion 161 to move via one or more linkages coupled between the actuator and the cam track portion 161 so that the cam track portion 161 can be selectively moved into at least partial coplanar alignment with the body 135 of the lower cam plate 121 such that the cam track portions 161 can be positioned along respective portions of respective cam tracks 137.

Turning to FIGS. 6-8B, the flight assemblies 133 will be described according to an exemplary embodiment of the disclosure. The flight assemblies 131 can include a top plate 163 to which a pair of flight bar receiving flanges 165 can be coupled extending in the direction M2, and to which a flight bar receiving block 167 can be coupled generally extending in the direction M1. The flight bar receiving flanges 165, as shown, define a respective aperture 169 for receiving a portion of a respective flight support bar 131 therethrough. Similarly, the flight bar receiving block 167 can define a passage 171 for receiving a portion of a respective flight support bar 131 therethrough.

The top plate 163 of the flight assembly 163 can at least partially define an elongate slot 173 at least partially defined therethrough that generally aligns with a complementary slot 175 at least partially defined in a frame element 177 positioned below the top plate 163. The aligned slots 173, 175 are arranged for at least partially receiving the lower portion of a cam follower 179 (broadly, "first cam follower" or "second cam follower" or "outer cam follower") supported on a brace 181.

The aligned slots 173, 175 are further arranged to receive an adapter plate 183 therethrough for effecting rotation of a portion of the flight assembly 133, as described further herein. The adapter plate 183, as shown, is configured for coupling to the lower portion of the cam follower 179 and a portion of the brace 181 extending away therefrom. A rack 185 supports the adapter plate 183 extending upwardly therefrom, and has a body 187 defining a plurality of teeth 189 facing a central portion of the flight assembly 133 to facilitate rotation of a portion thereof, as described further herein.

The top plate 163 also defines an opening 191 for at least partially receiving a cam follower 193 (broadly, "first cam follower" or "second cam follower" "central cam follower") therethrough, the cam follower 193 generally supported on and extending upwardly from a generally cylindrical base 195.

The base 195, as shown, can be at least partially received in a recessed portion 197 defined in the body 199 of a pinion 201 positioned abutting the rack 185. Accordingly, the body 199 of the pinion 201 includes a gear portion 203 within which the recessed portion 197 is at least partially defined and about which a plurality of teeth 205 are defined in meshing engagement with the teeth 189 of the rack 185 adjacent thereto. The body 199 of the pinion 201 further includes a flange portion 207 extending downwardly from the gear portion 203 thereof.

A generally disc-like plate 209 can be coupled below the flange portion 207 of the pinion 201, and can at least partially receive an attachment bar 211 along a lower portion thereof, the attachment bar 211 for spanning and coupling two a pair of blocks 213 spaced apart from one another.

Each block 213, as shown, includes a body 215 that defines a respective pair of passages therethrough, the respective passage closest the pinion 201 at least partially receiving a respective adjustment bar 217 linearly slidable therethrough. The respective adjustment bar 217 has a respective body 219 defining a plurality of teeth 221 facing an opening 223 in the body 215 of the respective block 213 such that the respective teeth 221 are positioned in meshing engagement with the teeth 225 defined along the body of a lower adjustment gear 227 positioned between the blocks 213. The lower adjustment gear 227 can have upper teeth or another interfacing structure that can mesh with a complementary feature or surface of an upper adjustment gear 226.

In this regard, rotation of the adjustment gears 226, 227 can cause the respective adjustment bar 217 to slid interiorly into the body 215 of the respective block 213 or exteriorly thereof via meshing engagement of the respective teeth 221, 225.

The body 215 of each block 213 can also include a respective passage that at least partially receives a respective bushing tube 229 through which a respective attachment bar 231 is slidably moveable toward and away from the respective block 213.

The respective adjustments bars 217 and respective attachment bars 231 are attached to a pair of product engaging plates 233, as shown, which are spaced apart so as to at least partially receive and engage a product therebetween. The spacing of the product engaging plates 233 is thus determined by the relative extension of the respective adjustment bars 217 and respective attachment bars 231 from the respective blocks 213, such spacing can thus be adjusted via rotation of the adjustment gear 227 to cause the respective adjustment bars 217 to increase or decrease spacing between the product engaging plates 233.

The aforementioned arrangement of the respective flight assemblies 133 is such that the respective flight assemblies 133 are supported on respective flight support bars 131 extending through the respective flanges 165 and block 167.

The cam follower 179 can be forced, e.g., via engagement along a respective cam track 137 in the lower cam plate 121, to slidably move the adapter plate 183 along the aligned slots 173, 175 such that the rack 185 supported therebelow, via engagement of the teeth 189 thereof with the teeth 205 of the abutting pinion 201, causes the pinion 201 to rotate, with the plate 209 coupled therebelow rotating in kind to at least partially turn the blocks 213 and product engagement plates 233 attached thereto via the respective bars 217, 231 relative to the top plate 163. In this regard, the product engagement plates 233 are rotatably coupled to the top plate 163 through the pinion 201 for causing rotation of the product engagement plates 233 relative top the top plate 163.

In this regard, via relative movement of the cam followers 179, 193 of the respective flight assembly 133 along the cam tracks 137 of the lower cam plate 121 of the product engagement assembly, a product captured between the product engagement plates 233 can be caused to rotate for further processing downstream in the system 100.

Figure 9:
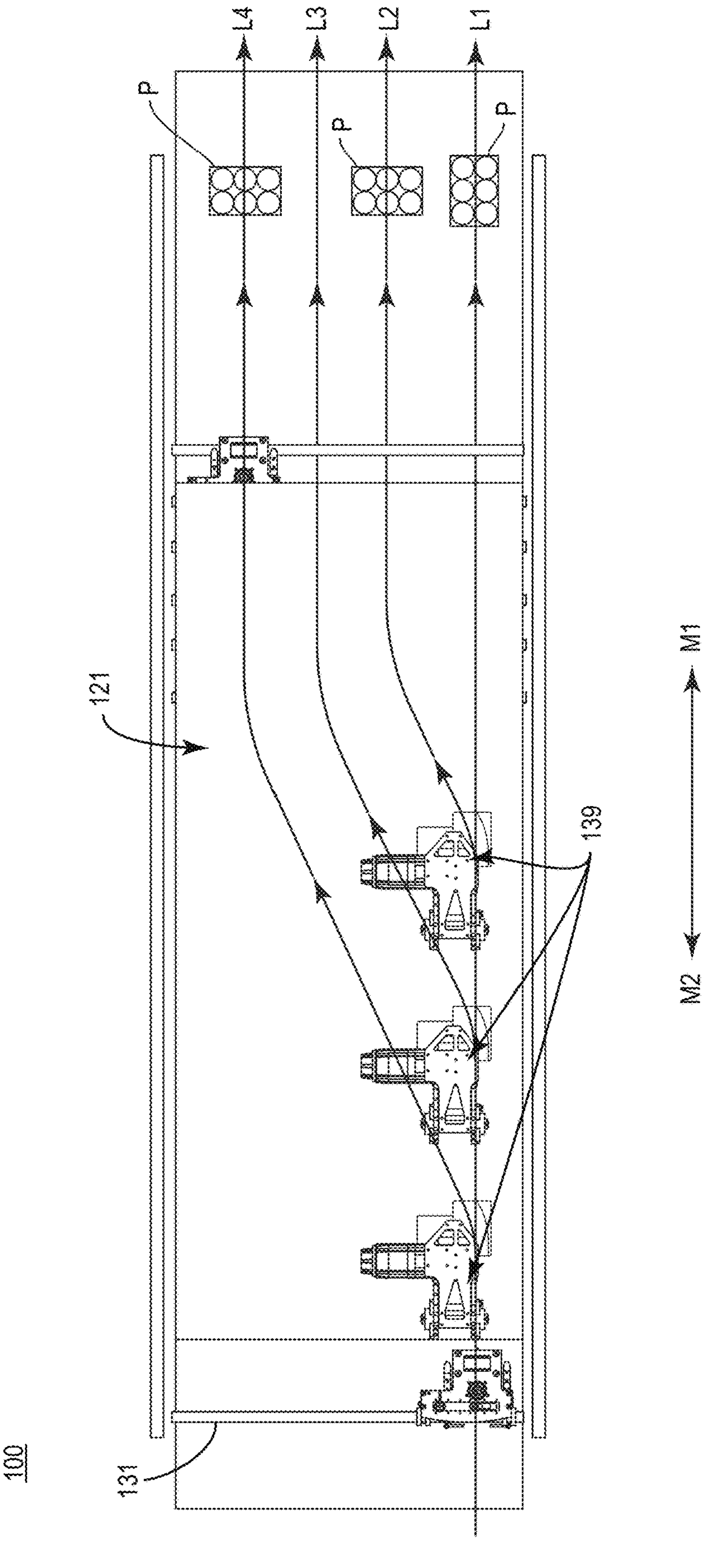
FIG. 9 is a schematic plan view of the direction of movement of a series of products along the conveyor belt under influence of the flight assemblies of the system and method of FIG. 1 according to an exemplary embodiment of the disclosure.
Figure 10:
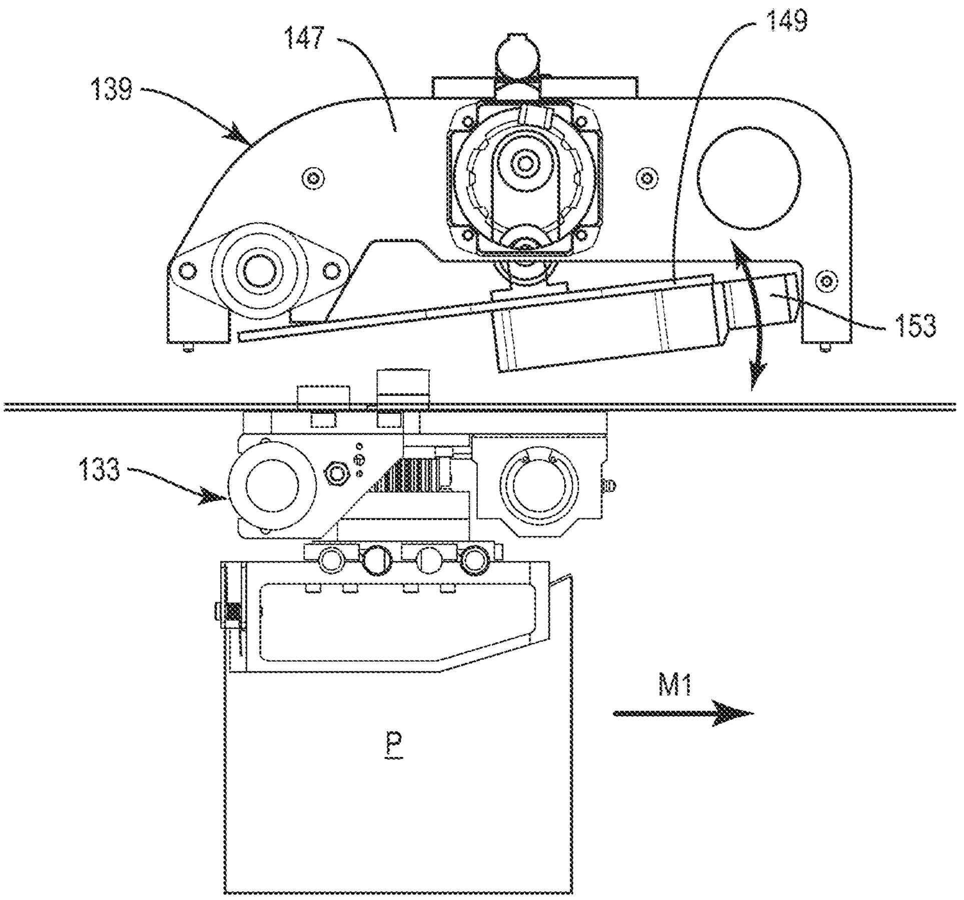
FIG. 10 is a side elevation view of an operation of a diverter assembly of the flight assembly product engagement assembly of the system and method of FIG. 1.

With reference to FIGS. 9 and 10, one or more operations of the system 100 according to an exemplary embodiment of the disclosure will be described.

One or more products P can be positioned on the conveyor belt 112 of the conveyor assembly 109 proximate the upstream end 105 of the system 100. In some embodiments, the products P can be received from a portion or station of the system 100 located upstream from the conveyor assembly 109. The products P can be provided in a generally linear fashion, e.g., coaxially disposed along an axis parallel to the machine direction M1, though it will be understood that, in some embodiments, a grouping station or apparatus can effect such arrangement.

One or more driving mechanisms associated with the conveyor assembly 109 can be driven to rotate to move the products P in the machine direction M1. Simultaneously or thereafter, the sprockets 129 of the product engagement assembly 103 can be driven to rotate to move the chains 127 extending therearound in the generally elliptical path, the bottom portion of such path generally extending in the machine direction M1. In this regard, the flight assemblies 133 can be carried on the flight support bars 131 into an overhead arrangement with the products P therebelow on the conveyor belt 112.

The product engagement plates 233 of the respective flight assemblies 133, as described above, can be spaced apart a width sufficient to receive an upper portion of a respective product P therebetween. In some embodiments, the product engagement plates 233 can be provided in an at least partial clamping engagement with a respective product P. As described above, the spacing of the product engagement plates 233 can be adjusted via rotation of the adjustment gear 227 to cause the respective adjustment bars 217 to increase or decrease spacing between the product engaging plates 233.

Upon approaching the respective cam tracks 137, the respective cam followers 179, 193 can enter the respective cam tracks 137 to slidably or rollably move along the sides thereof, driven by the respective flight support bars 131.

The diverter assemblies 139 of the product engagement assembly 103 can generally be disposed in a raised state, e.g., such that the diverter plate 149 and diverter track portions 153 carried thereon are pivoted upwardly and away from alignment with the respective cam tracks 137.

When it is desired to lower a respective diverter track portion 153 into alignment with a cam plate 121/respective cam track 137, the respective actuator 155 can be energized to selectively at least partially pivotably lower the diverter plate 149 and diverter body 151 carried thereon into at least partially coplanar alignment with the body 135 of the lower cam plate 121 such that the diverter track portions 153 can be positioned along respective portions of respective cam tracks 137 so as to divert the respective flight assembly 133 and product P carried thereby into a respective lane L2, L3, L4.

If, however, none of the diverter assemblies 139 are actuated such that the diverter track portions 153 remain raised at least partially away from the lower cam plate 121, the respective flight assembly 133 and product P carried thereby can remain engaged with the cam tracks 137 associated with the lane L1, e.g., so as to move generally linearly in the machine direction M1 without any relative movement of the cam followers 179, 193 to cause rotation of the product engagement plates 233 and product P at least partially held therebetween. In some embodiments, such movement of the flight assembly 133/product P along the lane L1 can be considered a rejection of the respective product P, for example, due to an imperfection, misalignment, to isolate the respective product P for inspection/quality control purposes, etc.

As shown, as the respective flight assemblies 133 move through the respective lanes L2, L3, L4, they approach the respective bypass assemblies 141. Referring again to FIG. 3 in addition to FIG. 9, when it is desired to cause at least partial rotation of the respective flight assembly 133 and product P at least partially held thereby, an actuator associated with the respective bypass assembly 141 can be activated so that the cam track portion 161 can be selectively moved into at least partial coplanar alignment with the body 135 of the lower cam plate 121 such that the cam track portions 161 can be positioned along respective portions of respective cam tracks 137.

As shown, the positioning of a respective cam track portion 161 along a respective cam track 137 is such that cam tracks 137 associated with the cam followers 179, 191 of a respective flight assembly 133 generally converge. In this regard, the respective cam follower 179 is caused to slidably move the adapter plate 183 along the aligned slots 173, 175, e.g., toward the cam follower 191, such that the rack 185 supported therebelow, via engagement of the teeth 189 thereof with the teeth 205 of the abutting pinion 201, causes the pinion 201 to rotate, with the plate 209 coupled therebelow rotating in kind to at least partially turn the blocks 213 and product engagement plates 233 attached thereto via the respective bars 217, 231 relative to the top plate 163.

The effect of the aforementioned rotation of the product engagement plates 233 is such to rotate the respective product P, for example, generally 90 degrees about an axis parallel to the vertical directions V1, V2, though it will be understood that the flight assemblies 133 can be configured to rotate a respective product P to a different degree.

If, however, the respective bypass assemblies 141 are not activated such that the respective cam track portion 161 remains in an at least partially raised state out of alignment with the respective cam track 137, the cam follower 179 remains generally unforced and unmoved relative to the cam follower 193, such that no rotation of the pinion 201 and product engagement plates 233 at least partially holding the product P is effected such that a rotational arrangement of the respective flight assembly 133 is maintained. Accordingly, the product P can arrive at a downstream portion of a respective lane L2, L3, L4 in a generally similar rotational configuration as that upon entry on the conveyor belt 112, which may be desirable in some situations, e.g., during maintenance and/or switchover operations, etc.

Upon arriving at the downstream end 107 of the system 100, at least the respective cam follower 193 of the respective flight assembly 133 can enter a respective return rail 125 and a respective return cam track 147 for travel in the machine direction M2 toward and onto the return rail 123, which returns the respective flight assembly 133 to the upstream end 105 of the system 100, partially shown in FIG. 2.

In some embodiments, the arrangement of cam tracks 147 along the upper cam plate 119 can be such to cause the cam follower 179 is caused to slidably move the adapter plate 183 along the aligned slots 173, 175, e.g., away from the cam follower 193, such that the rack 185 supported therebelow, via engagement of the teeth 189 thereof with the teeth 205 of the abutting pinion 201, causes the pinion 201 to rotate, with the plate 209 coupled therebelow rotating in kind to at least partially turn the blocks 213 and product engagement plates 233 attached thereto via the respective bars 217, 231 relative to the top plate 163, having the effect of generally reversing the rotational orientation of the product engagement plates 233 effected by engagement with the lower cam plate 121 as described above.

In view of the foregoing, a system 100 with a product engagement assembly 103 is provided for efficiently providing selective rotational arrangements of products carried thereon, which can optimize loading and transferring operations, for example, and which is reconfigurable toward a large variety of different applications.

It will be understood that one or more components of the system 100 can have a different configuration, position, arrangement, etc., without departing from the disclosure.

In general, the blanks/constructs according to the present disclosure may be constructed from paperboard having a caliper so that it is heavier and more rigid than ordinary paper. The blank can also be constructed of other materials, such as cardboard, or any other material having properties suitable for enabling the construct to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of engaging a plurality of products, the method comprising:

positioning the plurality of products on a conveyor assembly;

driving the conveyor assembly to move the plurality of products in a machine direction;

driving a plurality of flight assemblies in a closed path about a product engaging assembly positioned above the conveyor assembly;

engaging a respective product with a respective flight assembly; and engaging the respective flight assembly with a respective cam track of a plurality of cam tracks along a cam plate of the product engaging assembly to one of maintain a rotational arrangement of a portion of the respective flight assembly or cause the portion of the respective flight assembly to rotate, the respective flight assembly comprises a top plate and a plurality of product engaging plates rotatably coupled to the top plate, the portion of the respective flight assembly is the plurality of product engaging plates, and the plurality of product engaging plates arranged for at least partially receiving a respective product therebetween, the plurality of product engaging plates are rotatably coupled to the top plate through a pinion, the flight assembly further comprising a cam follower extending from a rack operably coupled to the pinion for causing rotation of the plurality of product engaging plates relative to the top plate.

2. The method of claim 1, wherein the method further comprises engaging the cam follower in the respective cam track of the plurality of cam tracks to move the rack to cause rotation of the plurality of product engaging plates relative to the top plate.

3. The method of claim 2, wherein the cam follower is a first cam follower and the respective flight assembly comprises a second cam follower extending from the top plate, and the method further comprises moving the first cam follower toward the second cam follower to move the rack to cause rotation of the plurality of product engaging plates relative to the top plate.

4. The method of claim 1, wherein each flight assembly of the plurality of flight assemblies is associated with a respective product lane of a plurality of product lanes on the conveyor assembly, the plurality of product lanes comprising a generally straight product lane extending in the machine direction and at least one curved lane at least partially diverging from the generally straight product lane.

5. The method of claim 4, wherein the product engaging assembly further comprises a plurality of diverter assemblies operably engaged with the cam plate, each diverter assembly comprises a diverter plate pivotably arranged relative to the cam plate and supporting at least one diverter track portion thereon.

6. The method of claim 5, wherein the method further comprises pivotably moving the diverter plate of a respective diverter assembly toward a discontinuity in the cam plate to align the at least one diverter track portion with a respective cam track of the plurality of cam tracks to cause the respective flight assembly to move above the at least one curved product lane.

7. The method of claim 5, wherein the method further comprises maintaining the mount of a respective diverter plate at least partially above the cam plate to cause the respective flight assembly to remain above the generally straight product lane.

8. The method of claim 7, wherein the product engaging assembly further comprises a plurality of bypass assemblies operably engaged with the cam plate, each bypass assembly comprises at least one cam track portion pivotably arranged relative to the cam plate.

9. The method of claim 8, wherein the method further comprises pivotably moving the at least one cam track portion of a respective bypass assembly toward a discontinuity in the cam plate to align the at least one cam track portion with a respective cam track of the plurality of cam tracks to cause the portion of the flight assembly to rotate.

10. The method of claim 9, wherein the method further comprises engaging the cam follower in the respective cam track of the plurality of cam tracks to move the rack to cause rotation of the plurality of product engaging plates relative to the top plate.

11. The method of claim 10, wherein the cam follower is a first cam follower and the respective flight assembly comprises a second cam follower extending from the top plate, and the method further comprises moving the first cam follower toward the second cam follower to move the rack to cause rotation of the plurality of product engaging plates relative to the top plate.

12. The method of claim 8, wherein the method further comprises maintaining the at least one cam track portion of a respective bypass assembly at least partially above the cam plate to maintain the rotational arrangement of the portion of the respective flight assembly.

13. A system for engaging a plurality of products, the system comprising:

a conveyor assembly configured to move the plurality of products in a machine direction; and a product engaging assembly positioned above the conveyor assembly, the product engaging assembly comprising a plurality of flight assemblies for engaging a respective product of the plurality of products, the product engaging assembly comprising a cam plate and a plurality of cam tracks extending at least partially therealong, the plurality of flight assemblies movably supported along a closed path for engaging a respective cam track of a plurality of cam tracks for one of maintaining a rotational arrangement of a portion of the respective flight assembly or causing the portion of the respective flight assembly to rotate, the respective flight assembly comprises a top plate and a plurality of product engaging plates rotatably coupled to the top plate, the portion of the respective flight assembly is the plurality of product engaging plates, and the plurality of product engaging plates arranged for at least partially receiving a respective product therebetween, the plurality of product engaging plates are rotatably coupled to the top plate through a pinion, the flight assembly further comprising a cam follower extending from a rack operably coupled to the pinion for causing rotation of the plurality of product engaging plates relative to the top plate.

14. The system of claim 13, wherein the cam follower is configured for engagement in the respective cam track of the plurality of cam tracks to move the rack to cause rotation of the plurality of product engaging plates relative to the top plate.

15. The system of claim 14, wherein the cam follower is a first cam follower and the respective flight assembly comprises a second cam follower extending from the top plate, the first cam follower configured for movement toward the second cam follower to move the rack to cause rotation of the plurality of product engaging plates relative to the top plate.

16. The system of claim 13, wherein each flight assembly of the plurality of flight assemblies is associated with a respective product lane of a plurality of product lanes on the conveyor assembly, the plurality of product lanes comprising a generally straight product lane extending in the machine direction and at least one curved lane at least partially diverging from the generally straight product lane.

17. The system of claim 16, wherein the product engaging assembly further comprises a plurality of diverter assemblies operably engaged with the cam plate, each diverter assembly comprises a diverter plate pivotably arranged relative to the cam plate and supporting at least one diverter track portion thereon.

18. The system of claim 17, wherein the diverter plate of a respective diverter assembly is pivotable toward a discontinuity in the cam plate to align the at least one diverter track portion with a respective cam track of the plurality of cam tracks to cause the respective flight assembly to move above the at least one curved product lane.

19. The system of claim 17, wherein the product engaging assembly further comprises a plurality of bypass assemblies operably engaged with the cam plate, each bypass assembly comprises at least one cam track portion pivotably arranged relative to the cam plate.

20. The system of claim 19, wherein the at least one cam track portion of a respective bypass assembly is configured to be pivoted toward a discontinuity in the cam plate to align the at least one cam track portion with a respective cam track of the plurality of cam tracks to cause the portion of the flight assembly to rotate.

21. The system of claim 20, wherein the cam follower is configured for engagement in the respective cam track of the plurality of cam tracks to move the rack to cause rotation of the plurality of product engaging plates relative to the top plate.

22. The system of claim 21, wherein the cam follower is a first cam follower and the respective flight assembly comprises a second cam follower extending from the top plate, the first cam follower configured for movement toward the second cam follower to move the rack to cause rotation of the plurality of product engaging plates relative to the top plate.

23. A product engagement assembly for engaging a plurality of products, the product engagement assembly comprising:

a plurality of flight assemblies for engaging a respective product of the plurality of products;

a cam plate; and a plurality of cam tracks extending at least partially along the cam plate, the plurality of flight assemblies movably supported along a closed path for engaging a respective cam track of a plurality of cam tracks for one of maintaining a rotational arrangement of a portion of the respective flight assembly or causing the portion of the respective flight assembly to rotate, the respective flight assembly comprises a top plate and a plurality of product engaging plates rotatably coupled to the top plate, the portion of the respective flight assembly is the plurality of product engaging plates, and the plurality of product engaging plates arranged for at least partially receiving a respective product therebetween, the plurality of product engaging plates are rotatably coupled to the top plate through a pinion, the flight assembly further comprising a cam follower extending from a rack operably coupled to the pinion for causing rotation of the plurality of product engaging plates relative to the top plate.

24. The product engagement assembly of claim 23, wherein the cam follower is configured for engagement in the respective cam track of the plurality of cam tracks to move the rack to cause rotation of the plurality of product engaging plates relative to the top plate.

25. The product engagement assembly of claim 24, wherein the cam follower is a first cam follower and the respective flight assembly comprises a second cam follower extending from the top plate, the first cam follower configured for movement toward the second cam follower to move the rack to cause rotation of the plurality of product engaging plates relative to the top plate.

26. The product engagement assembly of claim 23, wherein the product engaging assembly further comprises a plurality of diverter assemblies operably engaged with the cam plate, each diverter assembly comprises a diverter plate pivotably arranged relative to the cam plate and supporting at least one diverter track portion thereon.

27. The product engagement assembly of claim 26, wherein the diverter plate of a respective diverter assembly is pivotable toward a discontinuity in the cam plate to align the at least one diverter track portion with a respective cam track of the plurality of cam tracks.

28. The product engagement assembly of claim 26, wherein the product engaging assembly further comprises a plurality of bypass assemblies operably engaged with the cam plate, each bypass assembly comprises at least one cam track portion pivotably arranged relative to the cam plate.

29. The product engagement assembly of claim 28, wherein the at least one cam track portion of a respective bypass assembly is configured to be pivoted toward a discontinuity in the cam plate to align the at least one cam track portion with a respective cam track of the plurality of cam tracks to cause the portion of the flight assembly to rotate.

30. The product engagement assembly of claim 29, wherein the cam follower is configured for engagement in the respective cam track of the plurality of cam tracks to move the rack to cause rotation of the plurality of product engaging plates relative to the top plate.

31. The product engagement assembly of claim 30, wherein the cam follower is a first cam follower and the respective flight assembly comprises a second cam follower extending from the top plate, the first cam follower configured for movement toward the second cam follower to move the rack to cause rotation of the plurality of product engaging plates relative to the top plate.

* * * * *